Jan. 30, 1940.   C. ELLIS   2,188,875
PLANT BOX
Filed April 20, 1938
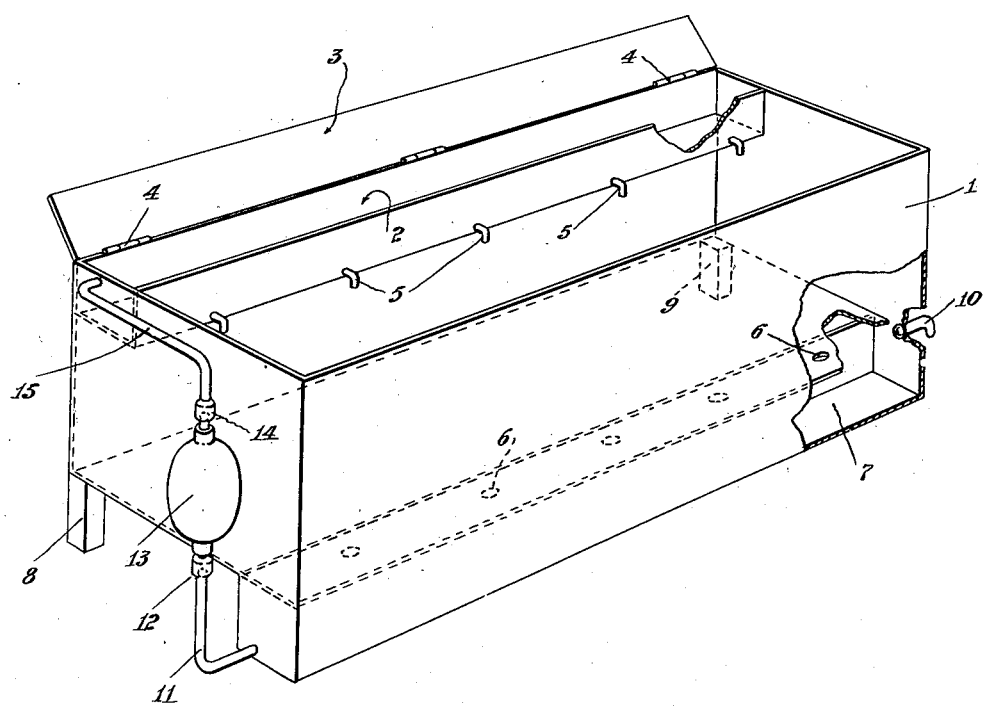
INVENTOR Patented Jan. 30, 1940

2,188,875

UNITED STATES PATENT OFFICE 2,188,875

PLANT BOX

Carleton Ellis, Montclair, N. J., assignor to Ellis Laboratories, Inc., a corporation of New Jersey Application April 20, 1938, Serial No. 203,048

2 Claims. (Cl. 47—1.2)

This invention relates to a box or other container adaptable for the growing of flowers, vegetables and other plants. It involves more particularly the propagation of plants or other vegetative growth by hydroculture methods.

When vegetables, flowers or other plants are grown in soil, the latter functions mainly in two ways, namely, as a supporting medium for the plant and as a source of food. When serving in the last-named manner, it is necessary that the soil be kept sufficiently moist so that a solution of the plant food is always available and may be absorbed by the roots of the growing plant. Only that portion of plant nutrient which is dissolved in the so-called soil solution is readily taken up through the roots and assimilated by the plant. Therefore if sufficient water or moisture is not continually present in the soil, the plant suffers from malnutrition and may eventually die.

In hydroculture methods, also known as soilless growth or nutrient culture, the plants may be grown in a supporting medium which is itself devoid, or substantially so, of nutrient elements. Examples of such media are sand and cinders. Food is fed to the plant by keeping the supporting medium continually moist with an aqueous solution in which are dissolved, in the appropriate proportions and concentrations, salts whose chemical constitution comprises those elements needed for plant growth. Examples of such salts are sodium nitrate, potassium di-hydrogen phosphate, calcium sulphate and magnesium chloride. By continually supplying the supporting medium with a solution of such salts there is always available for the plant an abundance of readily assimilable food.

My invention comprises a box or other suitable container in which flowers, vegetables or other plants may be grown by hydroculture methods. It comprises means for supplying the nutrient solution (or solution containing the plant food) in a continuous manner to the plant and also means for circulating said solution until its concentration of nutrient salts becomes sufficiently low as to render its nutrient value substantially negligible.

One form of my invention is illustrated by the accompanying drawing which is an isometric projection of a rectangular plant box particularly applicable for my purpose. The sketch shows diagrammatically a nutrient-solution reservoir, a plant-propagating compartment and a nutrient-solution sump as well as means for transferring the nutrient solution from the sump back to the reservoir and thus maintaining a continuous circulation of solution through the plant box.

In the drawing 1 represents a rectangular plant-propagating compartment made of wood or other suitable material and in which is placed the supporting medium (not shown) for the plants. Along one upper edge and running longitudinally is a built-in nutrient-solution reservoir 2 over which fits the cover 3. The latter is attached to said reservoir by means of the hinges 4. In the bottom of the reservoir are inserted several small capillary tubes 5 which serve as drains or means for conveying the nutrient solution from the reservoir to the plant-propagating compartment. Longitudinally along the bottom of the plant-propagating compartment and diagonally opposite to the nutrient-solution reservoir are several small holes 6. These are located also directly above the nutrient-solution sump 7 which in turn forms at least a partial support for the plant box. Preferably the volume of the sump is equal to or larger than that of the reservoir. The other supports of the plant box in this case are the legs 8 and 9. At one end of the sump and near the top of it is a short length of pipe 10 bent in the form of a right angle which serves as an overflow for the sump. At the other end of the latter and located near the bottom is the outlet tube 11. The connection between outlet tube 11 and the sump should be of suitable design so that the outlet tube may be readily removed and, as a result, the opening thereby formed serve as a drain for any liquid in the sump. Outlet tube 11 communicates through valve 12 with the rubber bulb 13, and the latter in turn is connected by means of valve 14 and tube 15 with the reservoir.

In operation the small holes 6 are covered with wire screens or other material which will prevent the supporting medium from falling into the nutrient sump 7 but will not prevent nutrient solution from flowing therein. The plant-propagating compartment 1 is filled with white coarse sand, for example, as a supporting medium for the growing plants. The top level of the sand may be either slightly above or slightly below that of the capillary tubes 5. The sand is moistened with water, and the desired plants are then inserted therein. Next, the reservoir 2 is filled with the aqueous nutrient solution and the cover 3 closed. The aqueous solution drips very slowly through the capillary tubes 5 into the sand, thereby keeping the latter continually moist with the aqueous plant food and thus at all times maintaining a sufficient and available supply of nutrients in contact with the plant roots. The nutrient solution slowly seeps through the sand and through the holes 6 into the sump 7.

The solution may be transferred from the sump 7 into the reservoir 2 by means of the rubber bulb 13 and the tubes 11 and 15. When the bulb 13 is deflated by the application of pressure, the valve 12 closes and valve 14 opens, thus allowing passage of the contents of the bulb 13 through the valve 14 and tube 15 into reservoir 2. On releasing the pressure and as the bulb 13 inflates, valve 14 closes and valve 12 opens, and a portion of the liquid in sump 7 is drawn up through tube 11 and valve 12 into bulb 13. Thus, by deflating and inflating bulb 13 as much as desired of the liquid in sump 7 can be returned to reservoir 2 and subsequently allowed to seep through the sand back into the sump. In this manner the nutrient solution may be circulated several times through nutrient-solution reservoir, plant-propagating compartment and nutrient-solution sump (in the order named) before it is discarded.

As previously mentioned, the pipe 10 bent at a right angle serves as an overflow for the sump 7. This is particularly important when the box is kept outdoors, since in case of rain all excess liquid will seep through the sand and the holes 6 into the sump 7 and then overflow through pipe 10. In this manner any undue accumulation of water in plant-propagation compartment 1 is avoided. It is true that water (as the result of rains or other causes) getting into the compartment 1 will result in some dilution, or even loss, of the nutrient solution. These effects, however, may be rapidly overcome because of the plants taking up water and also because of some evaporation of water from the bed of sand. In cases of extreme dilution the nutrient solution can be discarded (for example, by disconnecting outlet pipe 11 and allowing the sump 7 to drain) and a new solution substituted for it.

As a specific illustration a plant box of the type described above was employed with the following plants: gerania, petunia and German ivy. Coarse white sand was used as the supporting medium, and the plant-propagation compartment was filled with this material until the level of the latter was slightly above that of the capillary tubes. Before putting in the sand the holes in the bottom of the plant-propagation compartment were covered with a fine-mesh wire screen. Six geranium cuttings (which had been rooted in sand and were 3 to 4 inches in height), six petunia plants (which had been grown from seed in soil and were 1 to 1.5 inches in height) and five German ivy plants (which had been rooted in sand and were 3 to 4 inches in height) were planted in the supporting medium which had been moistened previously with water. The nutrient-solution reservoir was filled with a solution which consisted of 5.8 grams of superphosphate (monocalcium phosphate plus calcium sulphate), 6.4 grams of sodium nitrate, 10.3 grams of magnesium sulphate (Epsom salts) and 3.9 grams of potassium chloride dissolved in 5 gallons of water. This nutrient solution was allowed to drip (through the capillary tubes) into the sand, through which it slowly seeped and finally drained into the sump beneath the plant-propagation compartment. When the nutrient-solution reservoir was almost empty, the liquid in the sump was transferred (as previously described) to the reservoir by means of the two-valved rubber bulb. As some evaporation of solution occurred during its passage through the sand, the latter was sprinkled occasionally water. About once a week the sump was drained of the liquid therein and a fresh portion of solution added to the nutrient-solution reservoir. Under these conditions of propagation the above-mentioned plants continued to grow and thrive.

The nutrient solution mentioned above worked well with the specifically named plants. However, I do not wish to imply that it is the only one which may be employed in conjunction with my invention. In fact, many other types of nutrient solutions are known, and the appropriate one must be used with the particular plant or plants which are being cultivated, as will be readily understood by those versed in the art.

Plant boxes suitable for my purpose can be made of wood. The latter is particularly applicable since it is inexpensive, and boxes made therefrom are for the most part relatively light in weight and therefore most easily moved from one place to another should the occasion arise. However, I do not wish to limit myself to this material, as others, such as iron or steel, may function equally well in many instances. Substances which exert an injurious effect on plants, such as galvanized iron or copper, should be avoided. Also, I do not wish to limit the plant boxes suitable for my purpose to any specific shape or size. As illustrated in the drawing, one of rectangular shape may serve admirably for many purposes. However, plant boxes which are built in the form, say, of a circle or a semicircle will work equally well. The location in which the box is to be placed may often determine its exact contour. Furthermore, the size will depend also to a large extent upon the location. A box which is to be used, for example, in the yard or garden can be considerably larger than one to be placed in a window. One of small size may serve very well on transportation conveyances, such as automobile trailers, electric trains, airplanes and the like.

Sand and cinders have been mentioned as examples of supporting media, or aggregates, with which the plant-propagating compartment may be filled. It is important that the aggregate be sufficiently coarse, otherwise it may pack so tightly around the plant roots as to interfere with their normal growth. Also, air cannot penetrate easily those masses of aggregates which contain an unduly large proportion of very fine particles, and as a consequence insufficient aeration of the plants will be experienced. This latter condition is highly undesirable and should not be permitted. Sand consisting for the most part of grains $\frac{1}{16}$ inch, or thereabouts, in diameter has been found suitable. Coal cinders which have been washed with water to remove extremely fine particles, as well as water-soluble material, and which are, say, 0.5 inch in diameter or smaller may be employed. Other examples of supporting media are gravel, granite, pumice and even, in some instances, coal. On the other hand, calcareous substances such as marble, limestone, dolomite and the like should be avoided.

It will be recognized that many modifications of the plant box are possible without departing from the spirit or the scope of my invention. For example, as indicated in the accompanying drawing, the three elements, nutrient-solution reservoir, plant-propagating compartment and nutrient-solution sump, are joined together rigidly as one unit. In this case the plant box may be easily picked up and moved easily from one location to another. However, these three elements may be fashioned as separate units and then combined and held in their respective places by any convenient means.

A plant box according to my invention possesses many advantages over the usual soil-containing box. For example, food is continually available in a form that may be quickly and readily assimilated by the plants. Also, water or moisture is always present in sufficient quantities to fulfill any and all needs of the plants. Furthermore, since the plant box may be readily shifted from one location to another, the growing plants can always be furnished with an ample supply of sunlight. As a result it is to be expected that much healthier and larger plants as well as increased yields of flowers or vegetables will be secured.

Although my invention has been described with particular reference to the growing of plants, it is equally applicable to the germination or sprouting of seeds. In the latter instances the seeds may be planted in the sand or other appropriate supporting medium and the latter moistened occasionally with water or nutrient solution. After the seeds have sprouted and attained a sufficient growth, then the young plants can be fed continually with the proper nutrient solution, as previously disclosed.

What I claim is:

1. A plant box comprising a plant-propagating compartment containing a plant-supporting medium of mineral aggregate, a nutrient-solution reservoir having a plurality of individual tubular capillary drains and built into said compartment; said reservoir being located above said aggregate and said drains projecting beneath the surface of said aggregate; and a support for said compartment comprising a nutrient-solution sump.

2. A plant box comprising a plant-propagating compartment having perforations in its base located along one edge and containing a plant-supporting medium of mineral aggregate, a nutrient-solution reservoir having a plurality of individual tubular capillary drains and built into said compartment diagonally opposite to said perforations; said reservoir being located above said aggregate and said drains projecting beneath the surface of said aggregate; and a support for said compartment comprising a nutrient-solution sump located beneath said perforations.

CARLETON ELLIS.